US012634327B2

(12) United States Patent
Xu et al.

(10) Patent No.: US 12,634,327 B2
(45) Date of Patent: May 19, 2026

(54) METHOD AND SYSTEM FOR ANALYZING INTERACTION SECURITY OF TCP/IP LAYERED NETWORK MODEL, AND STORAGE MEDIUM

(71) Applicant: TSINGHUA UNIVERSITY, Beijing (CN)

(72) Inventors: Ke Xu, Beijing (CN); Xuewei Feng, Beijing (CN); Yuxiang Yang, Beijing (CN); Qi Li, Beijing (CN); Min Zhu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 238 days.

(21) Appl. No.: 18/515,761

(22) Filed: Nov. 21, 2023

(65) Prior Publication Data

US 2024/0179176 A1     May 30, 2024

(30) Foreign Application Priority Data

Nov. 24, 2022     (CN) .......................... 202211482151.6

(51) Int. Cl.
    *H04L 29/00*        (2006.01)
    *G06F 21/57*        (2013.01)
    *H04L 9/40*         (2022.01)
(52) U.S. Cl.
    CPC ........ *H04L 63/1433* (2013.01); *G06F 21/577* (2013.01); *H04L 63/10* (2013.01);
    (Continued)
(58) Field of Classification Search
    CPC . H04L 63/1441; H04L 63/10; H04L 63/1433; H04L 63/20; H04L 63/168;
    (Continued)

(56) References Cited

U.S. PATENT DOCUMENTS 8,032,939 B2 *  10/2011  Palnitkar ............. H04W 12/122
                                                      709/224
8,316,447 B2 *  11/2012  Guruswamy ......... G06F 21/577
                                                      726/25

(Continued)

FOREIGN PATENT DOCUMENTS

CN        103729295        4/2014
CN        113254945        8/2021

OTHER PUBLICATIONS

CNIPA, First Office Action for CN Application No. 202211482151.6, Jan. 20, 2023.

*Primary Examiner* — Don G Zhao
(74) *Attorney, Agent, or Firm* — Hodgson Russ LLP

(57) ABSTRACT

A method system for analyzing interaction security a TCP/IP layered network model includes: acquiring a cross-layer interaction vulnerability set in the TCP/IP layered network model, and converting target protocol stack source codes into intermediate representations (IRs); dividing a network protocol stack into different layers by scanning the converted IRs, and obtaining source key variables by marking variables for indicating cross-layer interaction in the network protocol stack; obtaining propagation variables by marking variables based on a relationship with the source key variables, and obtaining a propagation path based on a marking sequence of the propagation variables; and obtaining a vulnerability detection result, by performing vulnerability detection based on the propagation path and the cross-layer interaction vulnerability set.

9 Claims, 2 Drawing Sheets

(52) U.S. Cl.
CPC ........ H04L 63/1441 (2013.01); H04L 63/168
(2013.01); H04L 63/20 (2013.01)

(58) Field of Classification Search
CPC ..... H04L 69/08; H04L 69/163; G06F 21/577;
Y02D 30/50
See application file for complete search history.

(56) References Cited

U.S. PATENT DOCUMENTS

| | | | | |
|---|---|---|---|---|
| 8,547,974 B1* | 10/2013 | Guruswamy | ......... | H04L 43/026 |
| | | | | 370/395.5 |
| 9,838,246 B1* | 12/2017 | Hegde | ..................... | H04L 45/28 |
| 12,289,220 B1* | 4/2025 | Pillay | ..................... | H04L 41/16 |
| 2004/0064737 A1* | 4/2004 | Milliken | .............. | H04L 63/145 |
| | | | | 726/13 |
| 2006/0159098 A1* | 7/2006 | Munson | .................. | H04L 47/32 |
| | | | | 370/394 |
| 2008/0022397 A1* | 1/2008 | Cheng | ................ | H04L 63/1433 |
| | | | | 726/20 |
| 2008/0195781 A1* | 8/2008 | Kim | ..................... | G06F 13/387 |
| | | | | 710/308 |
| 2009/0006920 A1* | 1/2009 | Munson | ............... | H04L 1/1848 |
| | | | | 714/748 |
| 2009/0158046 A1* | 6/2009 | Milliken | .............. | G06F 21/562 |
| | | | | 713/181 |

| | | | | |
|---|---|---|---|---|
| 2010/0100930 A1* | 4/2010 | King | ................... | H04L 63/1433 |
| | | | | 726/1 |
| 2015/0040229 A1* | 2/2015 | Chan | ..................... | G06F 21/577 |
| | | | | 726/25 |
| 2017/0017789 A1* | 1/2017 | Daymont | ............. | G06F 21/566 |
| 2019/0149449 A1* | 5/2019 | Morris | ................... | H04L 45/22 |
| | | | | 709/245 |
| 2020/0057856 A1* | 2/2020 | Daymont | ........... | G06F 11/3612 |
| 2020/0177614 A1* | 6/2020 | Burns | .................. | G06F 21/577 |
| 2021/0119930 A1* | 4/2021 | Debbage | .............. | H04L 1/1642 |
| 2021/0211450 A1* | 7/2021 | Aleidan | ............. | H04L 63/1416 |
| 2021/0326446 A1* | 10/2021 | Cao | ..................... | G06F 11/3636 |
| 2022/0083644 A1* | 3/2022 | Kulshreshtha | .......... | G06F 21/52 |
| 2022/0222350 A1* | 7/2022 | Franzen | ............... | G06F 11/321 |
| 2022/0239702 A1* | 7/2022 | Al Jarri | ............... | H04L 63/1425 |
| 2022/0261480 A1* | 8/2022 | Youngberg | .......... | G06F 21/563 |
| 2022/0263850 A1* | 8/2022 | Colyandro, Jr. | .... | H04L 63/1433 |
| 2022/0292304 A1* | 9/2022 | Suzani | ................. | G06N 3/0455 |
| 2022/0377103 A1* | 11/2022 | Shaw | ..................... | H04L 63/20 |
| 2023/0070701 A1* | 3/2023 | Wang | ..................... | H04L 41/0677 |
| 2023/0079427 A1* | 3/2023 | Shaw | ..................... | H04L 63/20 |
| | | | | 726/11 |
| 2023/0100792 A1* | 3/2023 | Petit | .................... | H04L 63/1491 |
| | | | | 726/23 |
| 2023/0362187 A1* | 11/2023 | Walch | ................. | H04L 63/1433 |
| 2024/0053978 A1* | 2/2024 | Li | ............................ | G06F 8/65 |
| 2024/0179176 A1* | 5/2024 | Xu | ..................... | H04L 63/1433 |

* cited by examiner

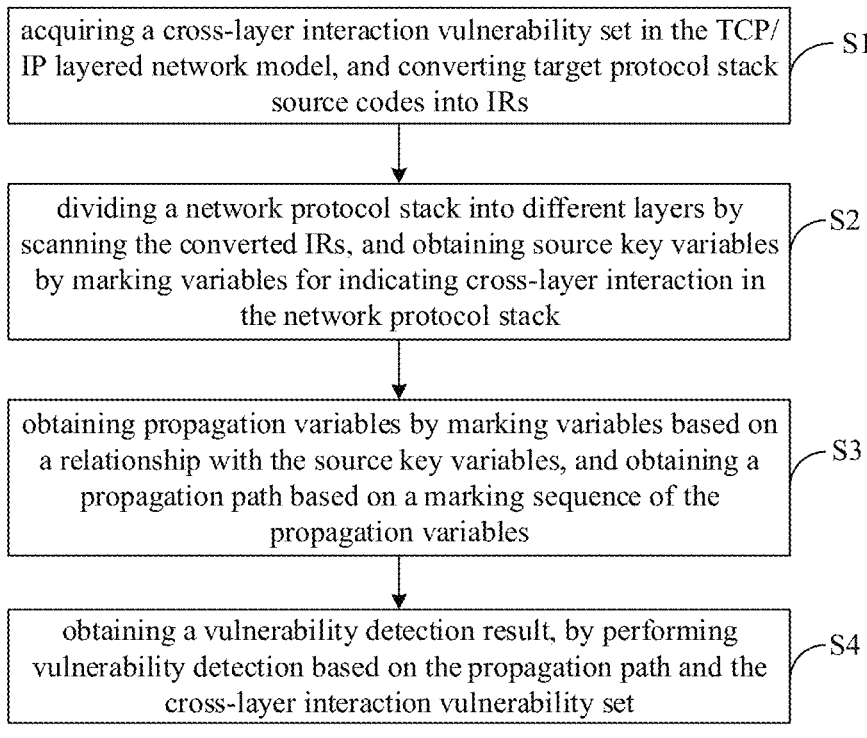

acquiring a cross-layer interaction vulnerability set in the TCP/ IP layered network model, and converting target protocol stack source codes into IRs — S1 dividing a network protocol stack into different layers by scanning the converted IRs, and obtaining source key variables by marking variables for indicating cross-layer interaction in the network protocol stack — S2 obtaining propagation variables by marking variables based on a relationship with the source key variables, and obtaining a propagation path based on a marking sequence of the propagation variables — S3 obtaining a vulnerability detection result, by performing vulnerability detection based on the propagation path and the cross-layer interaction vulnerability set — S4

FIG. 1

Layer B

Data

Layer A

FIG. 2

METHOD AND SYSTEM FOR ANALYZING INTERACTION SECURITY OF TCP/IP LAYERED NETWORK MODEL, AND STORAGE MEDIUM

CROSS-REFERENCE TO RELATED APPLICATION

This application claims priority to Chinese Patent Application No. 202211482151.6, filed on Nov. 24, 2022, the entire disclosure of which is incorporated herein by reference.

TECHNICAL FIELD

The disclosure relates to a field of computer network security technologies, and particularly to a method and a system for analyzing interaction security of a TCP/IP layered network model, and a storage medium.

BACKGROUND

A network protocol is a basis of normal and orderly operation of the whole network space, which defines how to exchange information among network devices, and ensures generation, transmission, reception and understanding of network messages among the network devices. To simplify the complexity of development and maintenance, and ensure that protocol functions are relatively independent from each other, a network protocol stack is generally designed based on a layered structure, such as an OSI seven-layer model and a TCP/IP four-layer model. Each protocol layer in the protocol stack performs a specific function, such as frame relaying at a link layer, packet routing at an IP layer, flow control and reliable transmission at a transmission layer, etc. Due to the layered architecture and the relatively independent design, each protocol layer in the protocol stack has been greatly developed and advanced. Correspondingly, protocol security is significantly improved, which may effectively handle with and relieve various attack threats.

SUMMARY

According to a first aspect of the disclosure, a method for analyzing interaction security of a TCP/IP layered network model is provided. The method includes: acquiring a cross-layer interaction vulnerability set in the TCP/IP layered network model, and converting target protocol stack source codes into intermediate representations (IRs): dividing a network protocol stack into different layers by scanning the converted IRs, and obtaining source key variables by marking variables for indicating cross-layer interaction in the network protocol stack: obtaining propagation variables by marking variables based on a relationship with the source key variables, and obtaining a propagation path based on a marking sequence of the propagation variables: and obtaining a vulnerability detection result, by performing vulnerability detection based on the propagation path and the cross-layer interaction vulnerability set.

According to a second aspect of the disclosure, a system for analyzing interaction security of a TCP/IP layered network model. The system includes a processor and a memory stored with instructions executable by the processor. The processor is configured to: acquire a cross-layer interaction vulnerability set in the TCP/IP layered network model, and converting target protocol stack source codes into IRs: divide a network protocol stack into different layers by scanning the converted IRs, and obtain source key variables by marking variables for indicating cross-layer interaction in the network protocol stack: obtain propagation variables by marking variables based on a relationship with the source key variables, and obtain a propagation path based on a marking sequence of the propagation variables: and obtain a vulnerability detection result, by performing vulnerability detection based on the propagation path and the cross-layer interaction vulnerability set.

According to a third aspect of the disclosure, a non-transitory computer readable storage medium is stored with computer instructions. When the computer instructions are executed by a computer, the computer is caused to perform a method for analyzing interaction security of a TCP/IP layered network model. The method includes: acquiring a cross-layer interaction vulnerability set in the TCP/IP layered network model, and converting target protocol stack source codes into IRs: dividing a network protocol stack into different layers by scanning the converted IRs, and obtaining source key variables by marking variables for indicating cross-layer interaction in the network protocol stack: obtaining propagation variables by marking variables based on a relationship with the source key variables, and obtaining a propagation path based on a marking sequence of the propagation variables: and obtaining a vulnerability detection result, by performing vulnerability detection based on the propagation path and the cross-layer interaction vulnerability set.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become easy to understand from the following description of the embodiments in conjunction with the accompanying drawings.

FIG. 1 is a flowchart illustrating a method for analyzing interaction security of a TCP/IP layered network model according to an embodiment of the disclosure.

FIG. 2 is a diagram illustrating a data transfer model between two layers in a protocol stack according to an embodiment of the disclosure.

DETAILED DESCRIPTION

Figure 3:
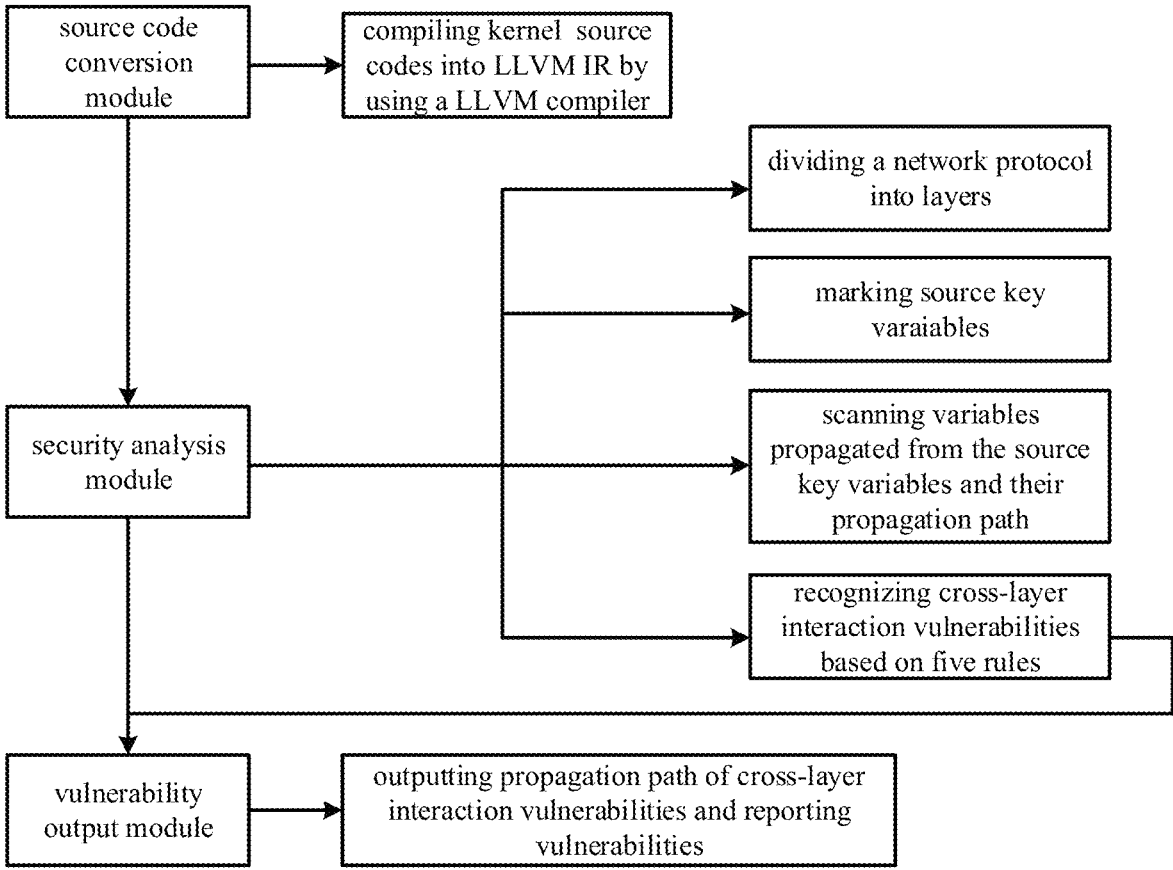
FIG. 3 is a structural diagram illustrating a system for analyzing interaction security of a TCP/IP layered network model according to an embodiment of the disclosure.

It should be noted that, the embodiments of the present disclosure may be combined with features in the embodiments without any conflict. The disclosure may be described referring to accompanying drawings in combination with the following embodiments. Throughout the drawings, the same or similar reference numerals refer to the same or similar elements or elements having the same or similar functions. The embodiments described below with reference to the accompanying drawings are exemplary, and are intended to be used to explain the disclosure, but should not be construed as a limitation to the disclosure.

In order to make those skilled in the art understand the technical solution of the present disclosure better, the technical solution in the embodiments of the present disclosure will be described clearly and completely in combination with accompanying drawings in the embodiments of the present disclosure. The embodiments described are only a part of embodiments in the present disclosure, rather than all the embodiments.

During a data transmission and reception process of the protocol stack, protocols in the protocol stack need to interact across layers and collaborate with each other. That is, each layer of protocol in the protocol stack, in addition to completing its specific function, also needs to call an interface function of an adjacent layer across layers, and submit data to the adjacent layer again for a next processing. Based on this interlayer interaction mode, generation, transferring, reception and storage of data are finally completed. For example, for transmission of an HTTP message, the HTTP message needs to be processed and encapsulated by calling a DNS protocol, a TCP protocol, an IP protocol, an ARP protocol and an ICMP protocol in an order.

Even if each layer of protocol in the protocol stack is robust enough in security, some security problems or exceptions may occur by combining the protocols together and performing a cross-layer interaction based on function calling. In particular, specific functions (even security attributes) of a certain layer may be damaged by a normal execution process of other layers, thereby introducing serious security problems. A targeted solution is lacked for the security problems occurred in the cross-layer interaction process of the network protocol.

The disclosure first summarizes five typical cross-layer interaction security problems existing in a TCP/IP protocol stack model in a formalized method, constructs common paradigms of various security problems, and detects cross-layer interaction security vulnerabilities in the protocol stack in an automatic analysis method, which improves the security and the robustness of the protocol stack.

A method and a system for analyzing interaction security of a TCP/IP layered network model according to the embodiments of the disclosure are described referring to accompanying drawings.

FIG. 1 is a flowchart illustrating a method for analyzing interaction security of a TCP/IP layered network model according to embodiments of the disclosure.

As illustrated in FIG. 1, the method includes but not limited to the following steps.

At S1, a cross-layer interaction vulnerability set in the TCP/IP layered network model is acquired, and target protocol stack source codes are converted into intermediate representations (IRs).

It may be understood that, there may be five cross-layer interaction vulnerability paradigms in the TCP/IP layered network model proposed in the disclosure. In a TCP/IP network protocol stack, assuming that a layer A and a layer B are exchanging data (taking as an example that data from the layer B is written into the layer A), such process may be simplified into a data transfer model between two entities, as illustrated in FIG. 2. In the process, the five cross-layer interaction vulnerability paradigms are disclosed below.

Ambiguity caused by a synchronization problem: B.write!=A.read. That is, when the layer B updates a state of a certain field in a kernel, while the layer A does not read the update completely, which may result in an incomplete or incorrect field value read by the layer A, and thus may result in security vulnerabilities between layers due to the non-synchronous states.

Information leakage caused by incomplete encapsulation: A.field=f (B.key) and observable (A.field)==True. That is, a field "key" in the layer B belongs to privacy protected information not detectable by attackers. However, a calculation method of a certain observable "field" in the layer A depends on the "key" in the layer B. For example, the calculation method includes: directly calculating from the "key" in the layer B, or determining and screening based on the "key" in the layer B. Due to incomplete encapsulation, an attacker may deduce the "key" in the layer B by observing the "field" in the layer A, thereby resulting in information leakage.

False operation caused by a semantic loss: A.write=f (B.payload) && trace (B.payload)==False. That is, the layer A performs a write operation based on a load of the layer B, but a load of the layer B cannot be traced, i.e., whether the load of the layer B is forged or contains an error cannot be verified. As such, it is deemed that the load of the layer B is correct and legitimate by default, resulting in that the layer A may potentially perform a false operation.

Identity fraud caused by a lack of verifying an input source: A.read==X.write and X!=B. That is, the "field" read by the layer A comes from X, rather than from the expected B. Since the protocol of the layer A in the protocol stack lacks a security measure for verifying an input source of the layer A, the layer A may be caused to receive forged information, thereby causing the identity fraud vulnerability:

False operation caused by a semantic overload: A.read==B.write and A.write$_1$=f$_1$(A.read) and A.write$_2$=f$_2$ (A.read). That is, the layer A may normally read the content written by the layer B, while a certain write operation "write$_1$" closely depends on the content read from the layer B. However, when other different write operation "write$_2$" is performed, the writer operation also depends on the content read from the layer B, which may result in the semantic overload of the content written by the layer B and thus lead to a false operation vulnerability in the kernel.

Specifically, the target protocol stack source codes are converted into the IRs.

Optionally, in the embodiment, the target protocol stack source codes are compiled into low level virtual machine (LLVM) IRs by using a LLVM compiler. The LLVM IR is configured to represent a form of codes in a complier. The advantages of performing program analysis by using the IR are mainly as follows: an instruction in the IR has a simple semantic meaning, each instruction only completes one function, the instruction is easier to be interpreted and executed, which ensures the analysis accuracy. Since the IR is characterized by precise semantics, an accuracy rate of the program analysis may be improved by analyzing based on the IR.

At S2, a network protocol stack is divided into different layers by scanning the converted IRs, and source key variables are obtained by marking variables for indicating cross-layer interaction in the network protocol stack.

Specifically, the network protocol stack is divided into different layers by scanning the IRs, and protocol implementations of different layers are defined.

Optionally; the embodiment mainly focuses on network interactions between basic layers in a TCP/IP protocol stack, that is, interactions that mainly occurs among the protocols at a link layer (e.g., Wi-Fi), an IP layer, an ICMP layer and a TCP layer.

Further, the source key variables are obtained by marking variables for interactions that may be performed among different layers or different protocols, which are stored in a global variable array: The source key variables represent data in which vulnerabilities may be introduced directly.

At S3, propagation variables are obtained by marking variables based on a relationship with the source key variables, and a propagation path is obtained based on a marking sequence of the propagation variables.

Optionally, in the embodiment, an interprocedural control flow graph (ICFG) and a data flow graph for a program may be constructed by using technologies such as pointer analysis and stain analysis. Based on the graphs, it may be recognized propagation variables between the protocol layers that may be propagated from the source key variables to a current layer and other layers.

Specifically, in the embodiment, variables having a direct value assignment relationship or an information transfer relationship with the source key variables are marked as propagation variables. For example, the value of variable 1 is equal to the value of variable 2, representing a direct value assignment relationship. The value of variable 1 may be either positive (if the value of variable 2 is equal to 1) or negative (if the value of variable 2 is equal to −1), representing an information transfer relationship.

Further, a propagation path is determined based on marked variables. In detail, a propagation path is constituted by all marked propagation variables sequentially on a propagation link from the source key variables to the propagation variables.

At S4, a vulnerability detection result is obtained by performing vulnerability detection based on the propagation path and the cross-layer interaction vulnerability set.

Specifically, a plurality of vulnerability paradigm rules are constructed based on a plurality of types of cross-layer interaction vulnerability paradigms in the cross-layer interaction vulnerability set: the propagation path is matched based on the vulnerability paradigm rules to obtain a matching result, and the vulnerability detection result is obtained based on the matching result. The vulnerability detection result includes the propagation path of the cross-layer interaction vulnerabilities.

Optionally, when the propagation variables and the propagation path are obtained, vulnerability matching rules are constructed based on the above-described five types of cross-layer interaction vulnerability paradigms, and matching of the propagation path is performed based on the vulnerability paradigm rules. When a paradigm of a certain rule is satisfied, it is deemed that vulnerabilities may exist and are recorded and stored. The corresponding propagation path of the cross-layer interaction vulnerabilities is output to report the detected vulnerabilities.

According to the method for analyzing interaction security of a TCP/IP layered network model in the embodiments of the disclosure, it is beneficial to automated mining and verification of cross-layer interaction vulnerabilities of a network protocol, a plurality of types of cross-layer interaction security vulnerabilities may be automatically detected and recognized in the disclosure, thereby allowing to discover hidden high-risk vulnerabilities in the target protocol stack, and improve the efficiency of analyzing the security vulnerabilities in the protocol stack and the robustness of the protocol stack.

As illustrated in FIG. 3, a system for analyzing interaction security of a TCP/IP layered network model is further provided in the embodiment. The system includes a source code conversion module 100, a security analysis module 200 and a vulnerability output module 300. In an embodiment, the system may be implemented by a computing device, such as being integrated into a computer.

The source code conversion module 100 is configured to acquire a cross-layer interaction vulnerability set in the TCP/IP layered network model, and convert target protocol stack source codes into IRs.

The security analysis module 200 is configured to: divide a network protocol stack into different layers by scanning the converted IRs, and obtain source key variables by marking variables for indicating cross-layer interaction in the network protocol stack: and obtain propagation variables by marking variables based on a relationship with the source key variables, and obtain a propagation path based on a marking sequence of the propagation variables.

The vulnerability output module 300 is configured to obtain a vulnerability detection result, by performing vulnerability detection based on the propagation path and the cross-layer interaction vulnerability set.

Further, the security analysis module 200 is also configured to: mark variables for introducing vulnerability data during the cross-layer interaction in the network protocol stack as the source key variables, and store the source key variables in a global variable array.

Further, the security analysis module 200 is also configured to:

determine the relationship with the source key variables based on a control flow graph and a data flow graph constructed by a taint analysis, and obtain the propagation variables by marking the variables based on the relationship with the source key variables. The relationship includes a value assignment relationship or an information transfer relationship: and sort the marked propagation variables based on a marking sequence of the propagation variables, and obtain the propagation path of the propagation variables based on a sorting result.

Further, the vulnerability output module 300 is also configured to:

construct a plurality of vulnerability paradigm rules based on a plurality of types of cross-layer interaction vulnerability paradigms in the cross-layer interaction vulnerability set: and obtain the vulnerability detection result by matching based on the propagation path and the vulnerability paradigm rules. The vulnerability detection result includes the propagation path of cross-layer interaction vulnerabilities.

Further, the source code conversion module 100 is further configured to: compile the target protocol stack source codes into LLVM IRs by using a LLVM compiler.

According to the system for analyzing interaction security of a TCP/IP layered network model in the embodiments of the disclosure, it is beneficial to automated mining and verification of cross-layer interaction vulnerabilities of a network protocol, a plurality of types of cross-layer interaction security vulnerabilities may be automatically detected and recognized in the disclosure, thereby allowing to discover hidden high-risk vulnerabilities in the target protocol stack, and improve the efficiency of analyzing the security vulnerabilities in the protocol stack and the robustness of the protocol stack.

According to another embodiment of the disclosure, a non-transitory computer readable storage medium and a computer program product are further provided in the disclosure.

According to an embodiment of the disclosure, a computer program product including a computer program is further provided in the disclosure, the computer program is configured to perform the steps of the method as described in the above embodiment when performed by a processor.

The logic and/or steps represented in flowcharts or otherwise described herein, for example, may be considered an ordered listing of executable instructions for implementing the logical functions, may be embodied in any computer-readable medium for use by or in conjunction with, an instruction execution system, apparatus, or device (such as a computer-based system, a system including a processor, or other system that may fetch instructions from and execute instructions from the instruction execution system, apparatus, or device). In view of this specification, a "computer-readable medium" may be any device that is able to contain, store, communicate, propagate, or transport programs for use by or in connection with the instruction execution system, apparatus, or device. More specific examples (non-exhaustive list) of computer readable media include: electrical connections (electronic devices) with one or more wiring, portable computer disk cartridges (magnetic devices), a random access memory (RAM), a read only memory (ROM), an erasable editable read only memory (EPROM) or a flash memory; fiber optic devices, and a portable compact disc read only memory (CD-ROM). In addition, the computer readable medium may even be paper or other suitable medium on which the programs may be printed, as the paper or other medium may be optically scanned, for example, followed by editing, interpretation, or other suitable medium as necessary process to obtain the programs electronically and then store them in the computer memory.

It should be understood that various parts of the disclosure may be implemented in hardware, software, firmware, or a combination thereof. In the above-described embodiments, various steps or methods may be implemented in software or firmware stored in a memory and executed by a suitable instruction execution system. For example, when various steps or methods may be implemented in hardware as in another embodiment, any one of the following techniques known in the art, or their combination may be used for implementation: discrete logic circuits with logic gate circuits for realizing logic function of data signal, application specific integrated circuits with appropriate combined logic gate circuits, programmable gate arrays (PGAs), field programmable gate arrays (FPGAs), etc.

The terms "module," "sub-module," "circuit," "sub-circuit," "circuitry;" "sub-circuitry;" "unit." or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In addition, terms "first" and "second" used in the present disclosure are only for description purpose, and may not be understood as indicating or implying a relative importance or implying a number of technical features indicated by implication. Therefore, the features limiting "first" and "second" may explicitly or implicitly include at least one of the features. In the description of the disclosure, "a plurality of" means at least two, for example two, three, etc., unless otherwise specified.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

Those skilled in the art may understand that all or part of the steps carried by the method of realizing the above embodiments may be completed by instructing the relevant hardware through a program, and the program may be stored in a computer-readable storage medium. When the program is executed, one or a combination of the steps of the method embodiments is implemented.

In addition, the functional units in various embodiments of the disclosure may be integrated in a processing module, or each unit may exist separately, or two or more units may be integrated in one module. The above integrated modules may be implemented in the form of hardware or software function modules. When the integrated module is realized in the form of software function module and sold or used as an independent product, it may also be stored in a computer-readable storage medium.

In descriptions of the specification, descriptions with reference to the terms "one embodiment", "some embodiments", "examples", "specific examples" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

It should be understood that, although the embodiments of the present disclosure are shown and described above, it may be understood that the above embodiments are exemplary and it shall not be construed as a limitation of the present disclosure. Those skilled in the art may change, modify, substitute and vary the above embodiments within the scope of the disclosure.

What is claimed is:

1. A method for analyzing interaction security of a TCP/IP layered network model, comprising:

acquiring a cross-layer interaction vulnerability set in the TCP/IP layered network model, and converting target protocol stack source codes into intermediate representations (IRs);

dividing a network protocol stack into different layers by scanning the converted IRs, and obtaining source key variables by marking variables for indicating cross-layer interaction in the network protocol stack;

obtaining propagation variables by marking variables based on a relationship between different source key variables, and obtaining a propagation path based on a marking sequence of the propagation variables; and obtaining a vulnerability detection result, by performing vulnerability detection based on the propagation path and the cross-layer interaction vulnerability set;

wherein obtaining the propagation variables by marking variables based on the relationship between different source key variables, and obtaining the propagation path based on the marking sequence of the propagation variables comprises:

determining the relationship between different source key variables based on a control flow graph and a data flow graph constructed by a taint analysis, and obtaining the propagation variables by marking the variables based on the relationship between different source key variables, wherein the relationship comprises a value assignment relationship or an information transfer relationship; and sorting the marked propagation variables based on the marking sequence of the propagation variables, and obtaining the propagation path of the propagation variables based on a sorting result;

wherein converting the target protocol stack source codes into the IRs comprises: compiling the target protocol stack source codes into low level virtual machine (LLVM) IRs by using a LLVM compiler.

2. The method according to claim 1, wherein obtaining the source key variables by marking the variables for indicating cross-layer interaction in the network protocol stack comprises:

marking variables for introducing vulnerability data during the cross-layer interaction in the network protocol stack as the source key variables, and storing the source key variables in a global variable array.

3. The method according to claim 1, wherein obtaining the vulnerability detection result by performing vulnerability detection based on the propagation path and the cross-layer interaction vulnerability set comprises:

constructing a plurality of vulnerability paradigm rules based on a plurality of types of cross-layer interaction vulnerability paradigms in the cross-layer interaction vulnerability set; and obtaining the vulnerability detection result by matching the propagation path and the plurality of vulnerability paradigm rules, wherein the vulnerability detection result comprises the propagation path of cross-layer interaction vulnerabilities.

4. A system for analyzing interaction security of a TCP/IP layered network model, comprising:

a processor; and a memory storing instructions executable by the processor;

wherein the processor is configured to:

acquire a cross-layer interaction vulnerability set in the TCP/IP layered network model, and converting target protocol stack source codes into intermediate representations (IRs);

divide a network protocol stack into different layers by scanning the converted IRs, and obtain source key variables by marking variables for indicating cross-layer interaction in the network protocol stack;

obtain propagation variables by marking variables based on a relationship between different source key variables, and obtain a propagation path based on a marking sequence of the propagation variables; and obtain a vulnerability detection result, by performing vulnerability detection based on the propagation path and the cross-layer interaction vulnerability set;

wherein the processor is further configured to:

determine the relationship between different source key variables based on a control flow graph and a data flow graph constructed by a taint analysis, and obtain the propagation variables by marking the variables based on the relationship between different source key variables, wherein the relationship comprises a value assignment relationship or an information transfer relationship; and sort the marked propagation variables based on the marking sequence of the propagation variables, and obtain the propagation path of the propagation variables based on a sorting result;

wherein the processor is further configured to: compile the target protocol stack source codes into low level virtual machine (LLVM) IRs by using a LLVM compiler.

5. The system according to claim 4, wherein the processor is further configured to:

mark variables for introducing vulnerability data during the cross-layer interaction in the network protocol stack as the source key variables, and store the source key variables in a global variable array.

6. The system according to claim 4, wherein the processor is further configured to:

construct a plurality of vulnerability paradigm rules based on a plurality of types of cross-layer interaction vulnerability paradigms in the cross-layer interaction vulnerability set; and obtain the vulnerability detection result by matching the propagation path and the plurality of vulnerability paradigm rules, wherein the vulnerability detection result comprises the propagation path of cross-layer interaction vulnerabilities.

7. A non-transitory computer readable storage medium storing computer instructions, wherein when the computer instructions are executed by a computer, the computer is caused to perform a method for analyzing interaction security of a TCP/IP layered network model, the method comprising:

acquiring a cross-layer interaction vulnerability set in the TCP/IP layered network model, and converting target protocol stack source codes into intermediate representations (IRs);

dividing a network protocol stack into different layers by scanning the converted IRs, and obtaining source key variables by marking variables for indicating cross-layer interaction in the network protocol stack;

obtaining propagation variables by marking variables based on a relationship between different source key variables, and obtaining a propagation path based on a marking sequence of the propagation variables; and obtaining a vulnerability detection result, by performing vulnerability detection based on the propagation path and the cross-layer interaction vulnerability set;

wherein obtaining the propagation variables by marking variables based on the relationship between different source key variables, and obtaining the propagation path based on the marking sequence of the propagation variables comprises:

determining the relationship between different source key variables based on a control flow graph and a data flow graph constructed by a taint analysis, and obtaining the propagation variables by marking the variables based on the relationship between different source key variables, wherein the relationship comprises a value assignment relationship or an information transfer relationship; and sorting the marked propagation variables based on the marking sequence of the propagation variables, and obtaining the propagation path of the propagation variables based on a sorting result;

wherein converting the target protocol stack source codes into the IRs comprises: compiling the target protocol stack source codes into low level virtual machine (LLVM) IRs by using a LLVM compiler.

8. The storage medium according to claim 7, wherein obtaining the source key variables by marking the variables for indicating cross-layer interaction in the network protocol stack comprises:

marking variables for introducing vulnerability data during the cross-layer interaction in the network protocol stack as the source key variables, and storing the source key variables in a global variable array.

9. The storage medium according to claim 7, wherein obtaining the vulnerability detection result by performing vulnerability detection based on the propagation path and the cross-layer interaction vulnerability set comprises:

constructing a plurality of vulnerability paradigm rules based on a plurality of types of cross-layer interaction vulnerability paradigms in the cross-layer interaction vulnerability set; and obtaining the vulnerability detection result by matching the propagation path and the plurality of vulnerability paradigm rules, wherein the vulnerability detection result comprises the propagation path of cross-layer interaction vulnerabilities.

\* \* \* \* \*